(12) United States Patent
Lewis et al.

(10) Patent No.: US 9,825,958 B2
(45) Date of Patent: Nov. 21, 2017

(54) METHODS, SYSTEMS, AND MEDIA FOR CONTROLLING ACCESS TO CONTENT

(71) Applicant: Google Inc., Mountain View, CA (US)

(72) Inventors: Justin Lewis, Marina del Rey, CA (US); Gavin James, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 338 days.

(21) Appl. No.: 14/611,888

(22) Filed: Feb. 2, 2015

(65) Prior Publication Data

US 2015/0281246 A1    Oct. 1, 2015

Related U.S. Application Data

(60) Provisional application No. 61/970,461, filed on Mar. 26, 2014.

(51) Int. Cl.
| | |
|---|---|
| *G06F 21/00* | (2013.01) |
| *H04L 29/06* | (2006.01) |
| *G06F 21/60* | (2013.01) |
| *G06F 21/62* | (2013.01) |

(52) U.S. Cl.
CPC ............ *H04L 63/101* (2013.01); *G06F 21/60* (2013.01); *G06F 21/62* (2013.01); *H04L 63/102* (2013.01); *H04L 63/104* (2013.01)

(58) Field of Classification Search
CPC ........ G06F 21/60; G06F 21/604; G06F 21/62; G06F 21/6209; G06F 21/6218; G06F 21/629
See application file for complete search history.

(56) References Cited

U.S. PATENT DOCUMENTS

2012/0197980 A1* 8/2012 Terleski ................. G06Q 50/01
                                                            709/203
2016/0232375 A1* 8/2016 Loeb .................... G06F 21/6245

* cited by examiner

*Primary Examiner* — Edward Zee
(74) *Attorney, Agent, or Firm* — Byrne Poh LLP

(57) ABSTRACT

Methods, systems, and media for controlling access to content are provided. In some embodiments, the method comprises: receiving a request to modify a first access list associated with a container item, wherein the first access list indicates a set of users that are authorized to access the container item; identifying the first access list in response to the request; accessing a second access list associated with a content item embedded in the container item, wherein the second access list indicates a set of users that are authorized to access the content item; modifying the first access list to filter out users from the first access list that are not included in the second access list; and storing the first access list such that the first access list is accessible to a host of the container item to verify that a requesting user is authorized to access the container item.

18 Claims, 7 Drawing Sheets

METHODS, SYSTEMS, AND MEDIA FOR CONTROLLING ACCESS TO CONTENT

CROSS-REFERENCE TO RELATED APPLICATION

This application claims the benefit of U.S. Provisional Patent Application No. 61/970,461, filed Mar. 26, 2014, which is hereby incorporated by reference herein in its entirety.

TECHNICAL FIELD

The disclosed subject matter relates to methods, systems, and media for controlling access to content.

BACKGROUND

Users of social networking sites increasingly share information, such as videos, photos, and links, with a select group of other users. This information can include posts, updates, and/or content items. However, it can be difficult to control which users have access to information once it is shared, especially when embedded content is shared within a post or update.

Accordingly, it is desirable to provide new methods, systems, and media for controlling access to content.

SUMMARY

Methods, systems, and media for controlling access to content are provided. In accordance with some embodiments of the disclosed subject matter, a method for controlling access to content is provided, the method comprising: receiving a first request to modify a first access list associated with a first container item, wherein the first access list indicates a set of users that are authorized to access the first container item; identifying, using a hardware processor, the first access list in response to the first request; accessing a second access list associated with a content item embedded in the first container item, wherein the second access list indicates a set of users that are authorized to access the content item; modifying the first access list to filter out users from the first access list that are not included in the second access list; receiving a second request to modify a third access list associated with a second container item, wherein the third access list indicates a set of users that are authorized to access the second container item; identifying the third access list in response to the second request; modifying the third access list to filter out users from the third access list that are not included in the second access list; and storing the first access list such that the first access list is accessible to a host of the first container item to verify that a requesting user is authorized to access the first container item.

In accordance with some embodiments of the disclosed subject matter, systems for controlling access to content are provided, the systems comprising: a hardware processor that is configured to: receive a first request to modify a first access list associated with a first container item, wherein the first access list indicates a set of users that are authorized to access the first container item; identify the first access list in response to the first request; access a second access list associated with a content item embedded in the first container item, wherein the second access list indicates a set of users that are authorized to access the content item; modify the first access list to filter out users from the first access list that are not included in the second access list; receive a second request to modify a third access list associated with a second container item, wherein the third access list indicates a set of users that are authorized to access the second container item; identify the third access list in response to the second request; modify the third access list to filter out users from the third access list that are not included in the second access list; and store the first access list such that the first access list is accessible to a host of the first container item to verify that a requesting user is authorized to access the first container item In accordance with some embodiments of the disclosed subject matter, non-transitory computer-readable media containing computer executable instructions that, when executed by a processor, cause the processor to perform a method for controlling access to content are provided, the method comprising: receiving a first request to modify a first access list associated with a first container item, wherein the first access list indicates a set of users that are authorized to access the first container item; identifying the first access list in response to the first request; accessing a second access list associated with a content item embedded in the first container item, wherein the second access list indicates a set of users that are authorized to access the content item; modifying the first access list to filter out users from the first access list that are not included in the second access list; receiving a second request to modify a third access list associated with a second container item, wherein the third access list indicates a set of users that are authorized to access the second container item; identifying the third access list in response to the second request; modifying the third access list to filter out users from the third access list that are not included in the second access list; and storing the first access list such that the first access list is accessible to a host of the first container item to verify that a requesting user is authorized to access the first container item In accordance with some embodiments of the disclosed subject matter, a system for controlling access to content is provided, the system comprising: means for receiving a first request to modify a first access list associated with a first container item, wherein the first access list indicates a set of users that are authorized to access the first container item; means for identifying, using a hardware processor, the first access list in response to the first request; means for accessing a second access list associated with a content item embedded in the first container item, wherein the second access list indicates a set of users that are authorized to access the content item; means for modifying the first access list to filter out users from the first access list that are not included in the second access list; means for receiving a second request to modify a third access list associated with a second container item, wherein the third access list indicates a set of users that are authorized to access the second container item; means for identifying the third access list in response to the second request; means for modifying the third access list to filter out users from the third access list that are not included in the second access list; and means for storing the first access list such that the first access list is accessible to a host of the first container item to verify that a requesting user is authorized to access the first container item In some embodiments, the container item is a post on a social networking site.

In some embodiments, the container item is a photo album.

In some embodiments, the third access list is a modified version of the first access list and the second container item is a modified version of the first container item.

In some embodiments, the first access list is modified to be equivalent to the second access list.

In some embodiments, the first access list is modified to be the intersection of the first access list and the second access list.

In some embodiments, the system further comprises: means for accessing a fourth access list associated with a second content item embedded in the container item, wherein modifying the first access list comprises excluding users that are not included in the second access list and that are not included in the fourth access list.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for controlling access to content are provided.

In accordance with some embodiments, the mechanisms described herein can synchronize an access list associated with a container item (e.g., a post on a social networking site, a document, an e-mail, and/or any other suitable type of container) and an access list associated with a content item embedded in the container item (e.g., a photo, a photo album, a video, a playlist, a link, and/or any other suitable type of embedded content item). As described herein, an access list refers to an access control list, which can specify a list of users and/or groups of users that are authorized to access content associated with the access list.

In some embodiments, the mechanisms described herein can modify an access list associated with a container item by filtering out users and/or groups that are not included in an access list associated with a content item embedded in and/or otherwise associated with the container item. For example, in instances where a content item (e.g., a photo, a video, a link, and/or any other suitable embedded content item) is shared with a post (e.g., on a social networking site), the mechanisms can modify an access list associated with the post to filter out users that are not included in an access list associated with the embedded content item. As described herein, a post can refer to content that is uploaded and/or published using a social networking site, which can include text content (e.g., news, updates, questions, and/or any other suitable text content) and/or any suitable content items, as described above.

In some embodiments, the container item and the embedded content item can be associated with a shared access list, and the mechanisms described herein can modify the shared access list based on a request to modify access parameters for either the container item or the embedded content item.

In some embodiments, the container item and the embedded content item can be associated with separate access lists, and the mechanisms described herein can modify one or more access lists in accordance with received requests to modify either the access list associated with a container item or with an embedded content item.

In some embodiments, access to a container item and/or an embedded content item can be set and/or modified by a user (e.g., a creator of the container item and/or the embedded content item) using a user interface containing one or more elements to control privacy settings.

Figure 1A:
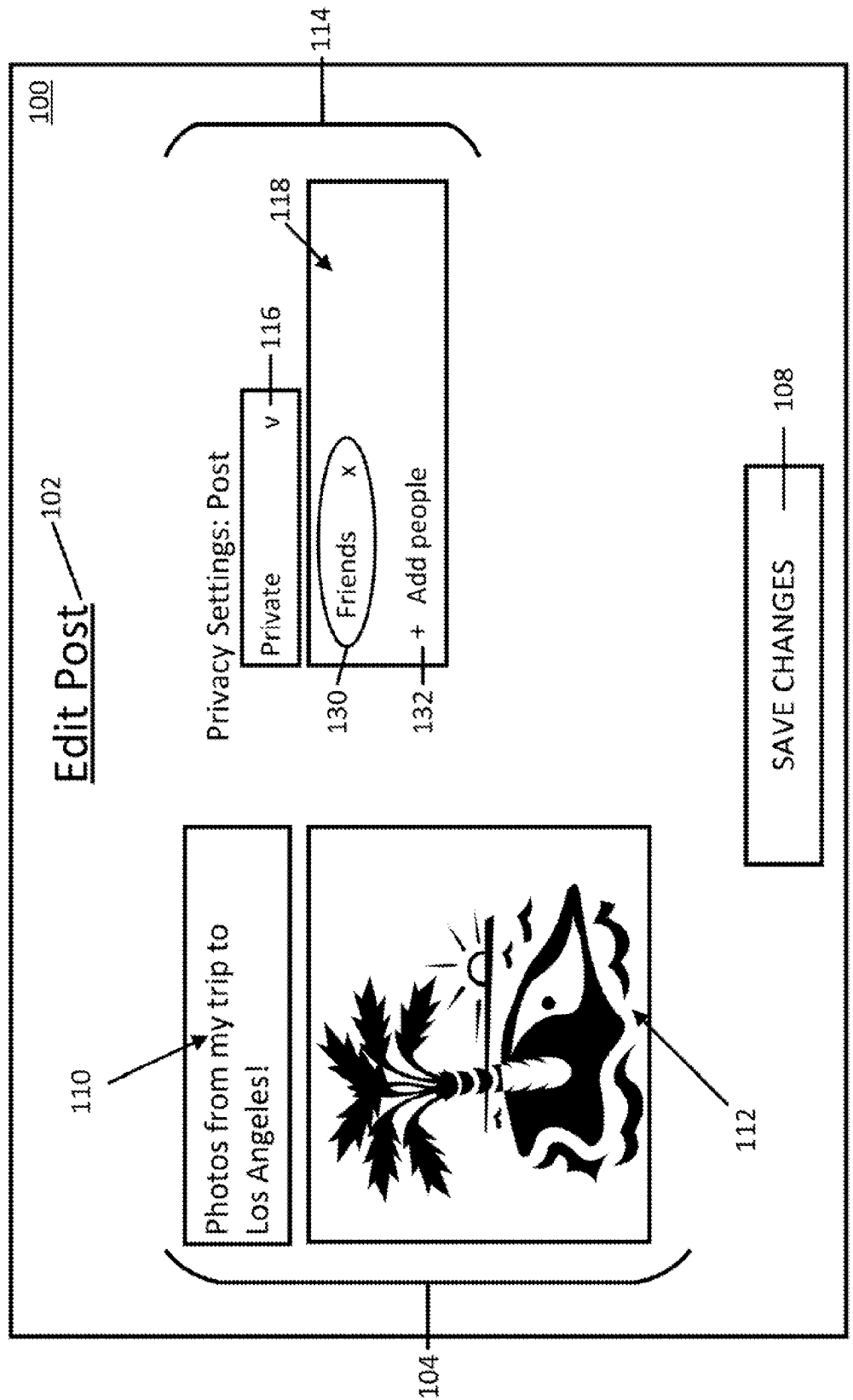
FIGS. 1A and 1B show examples of user interfaces for receiving privacy settings from a user in accordance with some embodiments of the disclosed subject matter.
Figure 1B:
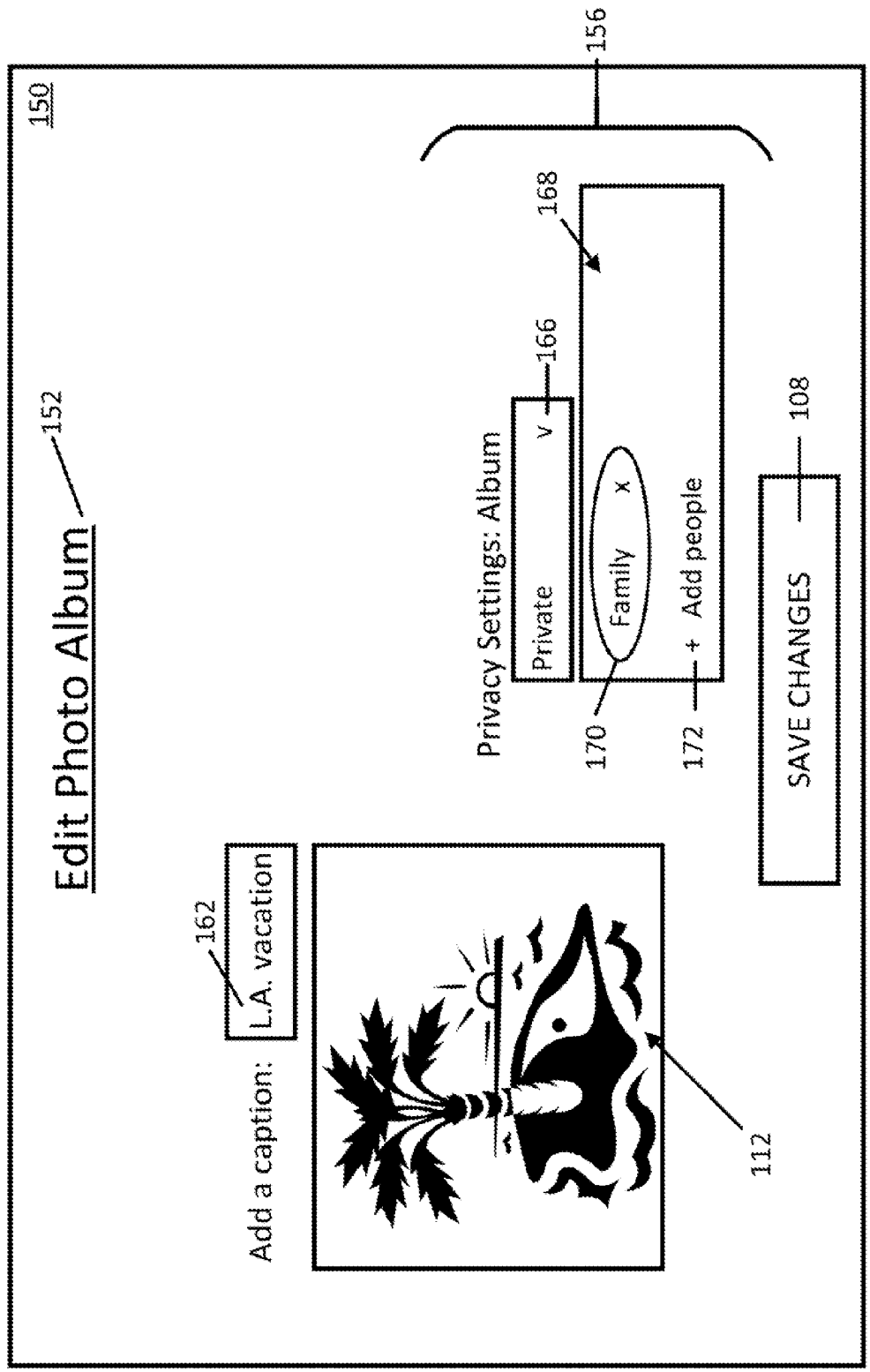

Turning to FIGS. 1A and 1B, examples 100 and 150 of user interfaces for receiving privacy settings associated with a container item (user interface 100) and with a content item embedded in the container item (user interface 150) are shown in accordance with some embodiments of the disclosed subject matter. As illustrated, in some embodiments, user interfaces 100 and 150 can include titles 102 and 152, a container item 104, a set of container privacy settings 114, a set of embedded content item privacy settings 156, and a selectable element to save changes 108.

In some embodiments, titles 102 and/or 152 can be any suitable indications of the content of user interfaces 100 and/or 150. For example, in some embodiments, titles 102 and/or 152 can include a block of text describing the content of user interfaces 100 and/or 150, as shown in FIGS. 1A and 1B. As another example, in some embodiments, titles 102 and/or 152 can indicate a provider of user interfaces 100 and/or 150. In some embodiments, titles 102 and/or 152 can include any suitable text, images, graphics, icons, animations, and/or any other suitable content. The positions of titles 102 and/or 152 within user interfaces 100 and/or 150 are shown merely as examples, and titles 102 and/or 152 can be located at any suitable positions. In some embodiments, titles 102 and/or 152 can be omitted.

In some embodiments, container item 104 can be any suitable container item of one or more content items. For example, as shown in FIG. 1A, container item 104 can be a post on a social networking site, which can include text 110 and a photo album 112. As another example, in some embodiments, container item 104 can be an e-mail, a document (e.g., a word processing document, a set of slides, a spreadsheet, a Portable Document Format (PDF) document, and/or any other suitable type of document), a photo album containing multiple photos, and/or any other suitable type of container. In some embodiments, container item 104 can include any suitable embedded content items, including text, photos, images, photo albums, videos, a playlist of videos (e.g., a set of multiple videos), audio content items, links to one or more content items, and/or any other suitable content items. Note that, in some embodiments, a container item can include both a container and an embedded content item. For example, a photo album which is embedded within a post on a social networking site can be both a container (for the multiple photos in the album) and an embedded content item (contained in the post). In some embodiments, container item 104 can include any suitable number of content items, including none.

In some embodiments, container item 104 can be associated with text 110, which can include any suitable text (and/or other suitable content) associated with container item 104. For example, as shown in FIG. 1A, text 110 can be a block of text describing photo album 112. As another example, in some embodiments, text 110 can include any other suitable information, such as a name of the creator of container item 104, a date and/or time associated with container 104 and/or text 110 (e.g., a date and/or time of creation, a date and/or time of a last modification, and/or any other suitable date and/or time), a location associated with container item 104 and/or text 110 (e.g., a place and/or location of creation, and/or any other suitable location), and/or any other suitable information. In some embodiments, text 110 can include any suitable text, images, icons, graphics, animations, and/or any other suitable content. In some embodiments, text 110 can be entered and/or modified by a user, for example, a creator of container 104.

In some embodiments, photo album 112 can be any suitable set of photos included in container 104. Photo album 112 can include any suitable number of photos. As shown in FIGS. 1A and 1B, photo album 112 can include an identifying image and/or photo which is presented in association with container 104. As a more particular example, one or more images and/or photos from the set of photos (e.g., the first photo, a photo selected by a creator of container item 104, a set of images representative of container item 104, and/or any other suitable photo) can be selected to be presented in user interface 100.

In some embodiments, photo album 112 can be associated with a caption 162, which can include any suitable text (and/or other suitable content) associated with photo album 112. For example, as shown in FIG. 1B, caption 162 can be a block of text describing photo album 112 and/or a particular photo in photo album 112. As another example, in some embodiments, caption 162 can include any other suitable information, such as a name of the creator of the associated embedded content item (e.g., photo album 112), a date and/or time associated with photo album 112 and/or caption 162 (e.g., a date and/or time of creation, a date and/or time of a last modification, and/or any other suitable date and/or time), a location associated with photo album 112 and/or caption 162 (e.g., a place and/or location of creation, and/or any other suitable location), and/or any other suitable information. In some embodiments, caption 162 can include any suitable text, images, icons, graphics, animations, and/or any other suitable content. In some embodiments, caption 162 can be entered and/or modified by a user, for example, a creator of photo album 112.

In some embodiments, container privacy settings 114 can specify privacy settings to be associated with container item 104. For example, as shown in FIG. 1A, container privacy settings 114 can specify which users of the social networking site will be allowed to view the post. In some embodiments, privacy settings presented in container privacy settings 114 can be presented as a result of receiving user input to change the associated privacy settings. Similarly, as shown in FIG. 1B, in some embodiments, embedded content item privacy settings 156 can specify privacy settings to be associated with the embedded content item (e.g., photo album 112).

As shown in FIGS. 1A and 1B, container privacy settings 114 and embedded content item privacy settings 156 can each include a privacy selection element (e.g., privacy selection elements 116 and 166) and a set of allowed viewers (e.g., set of allowed viewers 118 and 168).

In some embodiments, privacy selection elements 116 and 166 can receive a user selection (e.g., from a creator of container item 104 and/or an embedded content item in container item 104) to set and/or modify a list of allowed viewers of container item 104 and/or the embedded content item (e.g., photo album 112), respectively. For example, as shown in FIGS. 1A and 1B, privacy selection elements 116 and/or 166 can be set to "Private," indicating that viewership of container item 104 and/or photo album 112, respectively, is to be restricted. As another example, in some embodiments, privacy selection elements 116 and/or 166 can include a "Public" option, indicating that container item 104 and/or photo album 112, respectively, are to be visible to everyone without restriction. Privacy selection elements 116 and/or 166 can include any suitable user interface components. For example, privacy selection element 116 and/or 166 can include drop-down menus, which each include multiple privacy setting options, as shown in FIGS. 1A and 1B. As another example, in some embodiments, privacy selection elements 116 and/or 166 can include radio buttons, checkboxes, and/or any other suitable user interface components. In some embodiments, privacy selection elements 116 and/or 166 can be omitted.

In some embodiments, set of allowed viewers 118 and 168 can be used to allow a user (e.g., a creator of container item 104 and/or photo album 112) to set and/or modify the set of viewers allowed to view container item 104 and/or photo album 112, respectively. In some embodiments, the set of allowed viewers can be specified by groups (e.g., "family," "friends," "colleagues," "classmates," and/or any other suitable groups), as shown in FIGS. 1A and 1B. Additionally or alternatively, in some embodiments, the set of allowed viewers can be specified by names associated with users allowed to view the content. In some embodiments, set of allowed viewers 118 and/or 168 can each include an allowed entity indicator (e.g., allowed entity indicators 130 and 170) and an add viewer element (e.g., add viewer elements 132 and 172).

In some embodiments, allowed entity indicators 130 and 170 can indicate users and/or groups of users that are allowed to view container item 104 and/or a content item embedded in container item 104 (e.g., photo album 112), respectively. As shown in FIGS. 1A and 1B, allowed entity indicators 130 and/or 170 can include a block of text describing the user and/or group of users associated with the indicator. Additionally or alternatively, in some embodiments, allowed entity indicators 130 and/or 170 can include a selectable element (e.g., as shown as an "X" in FIGS. 1A and 1B) which can allow a user to remove the associated user and/or group of users from set of allowed viewers 118 and/or 168. Although only one allowed entity indicator is shown in each of set of allowed viewers 118 and 168, any suitable number of allowed entity indicators (including none) can be included. In some embodiments, allowed entity indicators 130 and/or 170 can include any suitable text, images, icons, avatars, and/or any other suitable content associated with the user and/or group of users associated with allowed entity indicator 130 and/or 170.

In some embodiments, add viewer elements 132 and/or 172 can, upon selection, cause a process to add a user and/or a group of users to set of allowed viewers 118 and/or 168, respectively, to be initiated. For example, in some embodiments, selection of elements 132 and/or 172 can cause a browse window with a list of contacts and/or groups (e.g., a list of the user's connections on a social networking site, a list of groups the user belongs to on a social networking site, and/or any other suitable contacts and/or groups) to be presented. In some embodiments, elements 132 and/or 172 can include any suitable text, images, graphics, icons, and/or any other suitable content. In some embodiments, elements 132 and/or 172 can be omitted.

In some embodiments, selectable element 108 can be used to initiate saving of any modifications made to one or more privacy settings within user interface 100. In some embodiments, modifications of privacy settings within user interface 100 can be saved automatically (e.g., every thirty seconds, every minute, upon detection of modification to set of privacy settings 114 and/or 156, and/or using any other suitable criteria). In some embodiments, selectable element 108 can be omitted.

Figure 2:
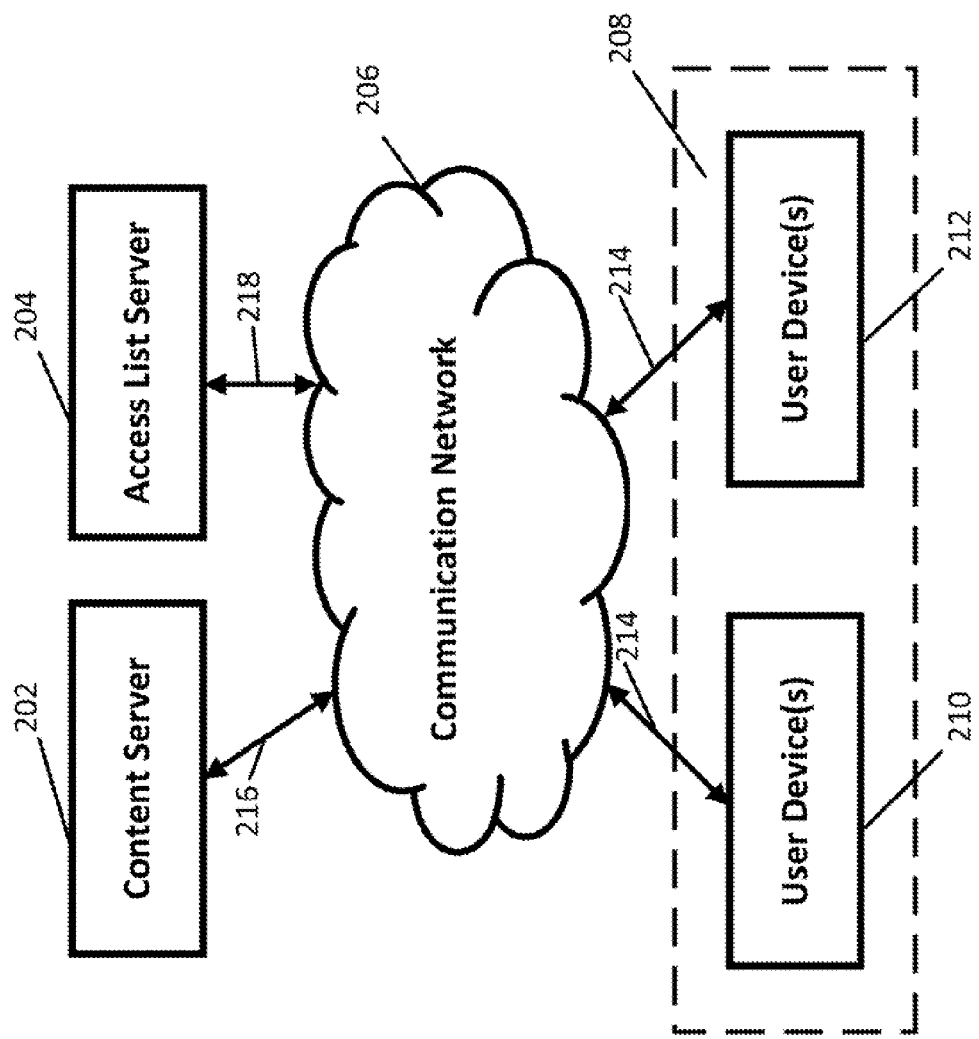
FIG. 2 shows a schematic diagram of an illustrative system suitable for implementation of mechanisms described herein for controlling access to content in accordance with some embodiments of the disclosed subject matter.

Turning to FIG. 2, an example 200 of hardware for controlling access to content that can be used in accordance with some embodiments of the disclosed subject matter is shown. As illustrated, hardware 200 can include one or more servers, including a content server 202 and an access list server 204, a communication network 206, and one or more user devices 208, such as user devices 210 and 212.

Content server 202 can be any suitable server for receiving, storing, and/or delivering content in some embodiments. For example, in some embodiments, content server 202 can be a server that receives content (e.g., the content described above in connection with FIGS. 1A and 1B) and stores the received content. As another example, in some embodiments, content server 202 can deliver content in response to receiving a request for that content. As a more particular example, in some embodiments, content server 202 can deliver content to a social networking site interface on a user device in response to receiving a request for a feed of multiple content items. As another more particular example, in some embodiments, content server 202 can deliver a media content item (e.g., a video, an audio content item, a playlist, and/or any other suitable media content) in response to receiving a request for the media content item (e.g., through a user selecting a link to the media content item, and/or any other suitable request). In some embodiments, content server 202 can be omitted.

Access list server 204 can be any suitable server for storing, modifying, and/or checking access lists in some embodiments. For example, access list server 204 can receive requests to create an access list, modify a stored access list, modify the stored access list in accordance with the received request, and/or deliver an indication of whether a specified user and/or group is included in an access list in response to receiving a request to present a content item associated with the access list in some embodiments. As a more particular example, in some embodiments, access list server 204 can receive a request to modify an access list associated with either a container item or an embedded content item and can modify the access list in accordance with the received request. As another more particular example, in some embodiments, access list server 204 can receive a request to modify an access list associated with a content item (e.g., photo album 112), modify the access list, identify one or more container items (e.g., container item 104) associated with the embedded content item, and/or modify the access lists associated with the identified container items. In some embodiments, access list server 204 can be omitted.

In some embodiments, access lists stored on access list server 204 can indicate specific users that have been given permission to view a particular container item and/or content item. For example, the access list can indicate names of users that have been given permission to view a particular container item and/or content item by username. Additionally or alternatively, in some embodiments, access lists can indicate one or more groups that have been given permission to view a particular container item and/or content item, and access list server 204 can maintain a separate list indicating users belonging to particular groups. Additionally, in some embodiments, access list server 204 can be notified when a user is added to or removed from a group, and can automatically update any access lists which include the group in response to the notification.

Communication network 206 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 208 can be connected by one or more communications links 214 to communication network 206 that can be linked via one or more communications links (e.g., communications links 216 and 218) to content server 202 and access list server 204. Communications links 214, 216, and 218 can be any communications links suitable for communicating data among user devices 108 and servers 202 and/or 204, such as network links, dial-up links, wireless links, hard-wired links, any other suitable communications links, or any suitable combination of such links.

User devices 208 can include any one or more user devices suitable for setting privacy settings, modifying privacy settings, presenting container items, presenting content items, and/or any other suitable functions. For example, in some embodiments, user devices 208 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 208 can be implemented as a non-mobile device such as a desktop computer, a set-top box, a television, a streaming media player, a game console, and/or any other suitable non-mobile device.

Although content server 202 and access list server 204 are illustrated as separate devices, the functions performed by content server 202 and access list server 204 can be performed using any suitable number of devices in some embodiments. For example, in some embodiments, the functions performed by content server 202 and access list server 204 can be performed on a single server. As another example, in some embodiments, multiple devices can be used to implement the functions performed by content server 202 and/or access list server 204.

Although two user devices 210 and 212 are shown in FIG. 2 to avoid over-complicating the figure, any suitable number of user devices, and/or any suitable types of user devices, can be used in some embodiments.

Figure 3:
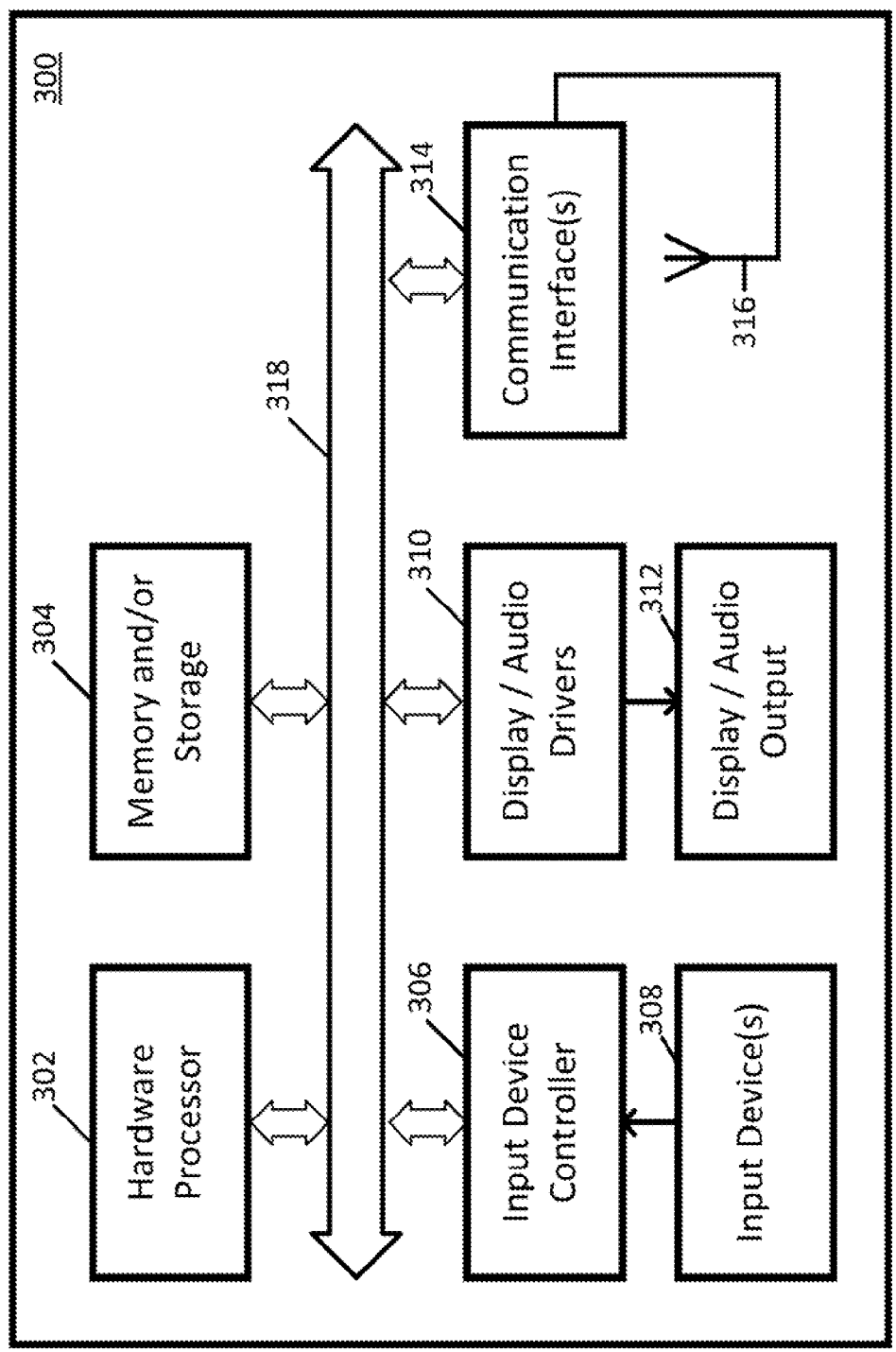
FIG. 3 shows a detailed example of hardware that can be used in a server and/or a user device of FIG. 2 in accordance with some embodiments of the disclosed subject matter.

Content server 202, access list server 204, and user devices 208 can be implemented using any suitable hardware in some embodiments. For example, in some embodiments, devices 202, 204, and 208 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program. For example, the server program can cause hardware processor 302 to receive a request to modify an access list associated with a container item and/or a content item, modify the access list in response to the request, deliver content to a user device in accordance with the access list, and/or perform any other suitable actions.

Memory and/or storage 304 can be any suitable memory and/or storage for storing access lists, programs, data, media content, social networking posts, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
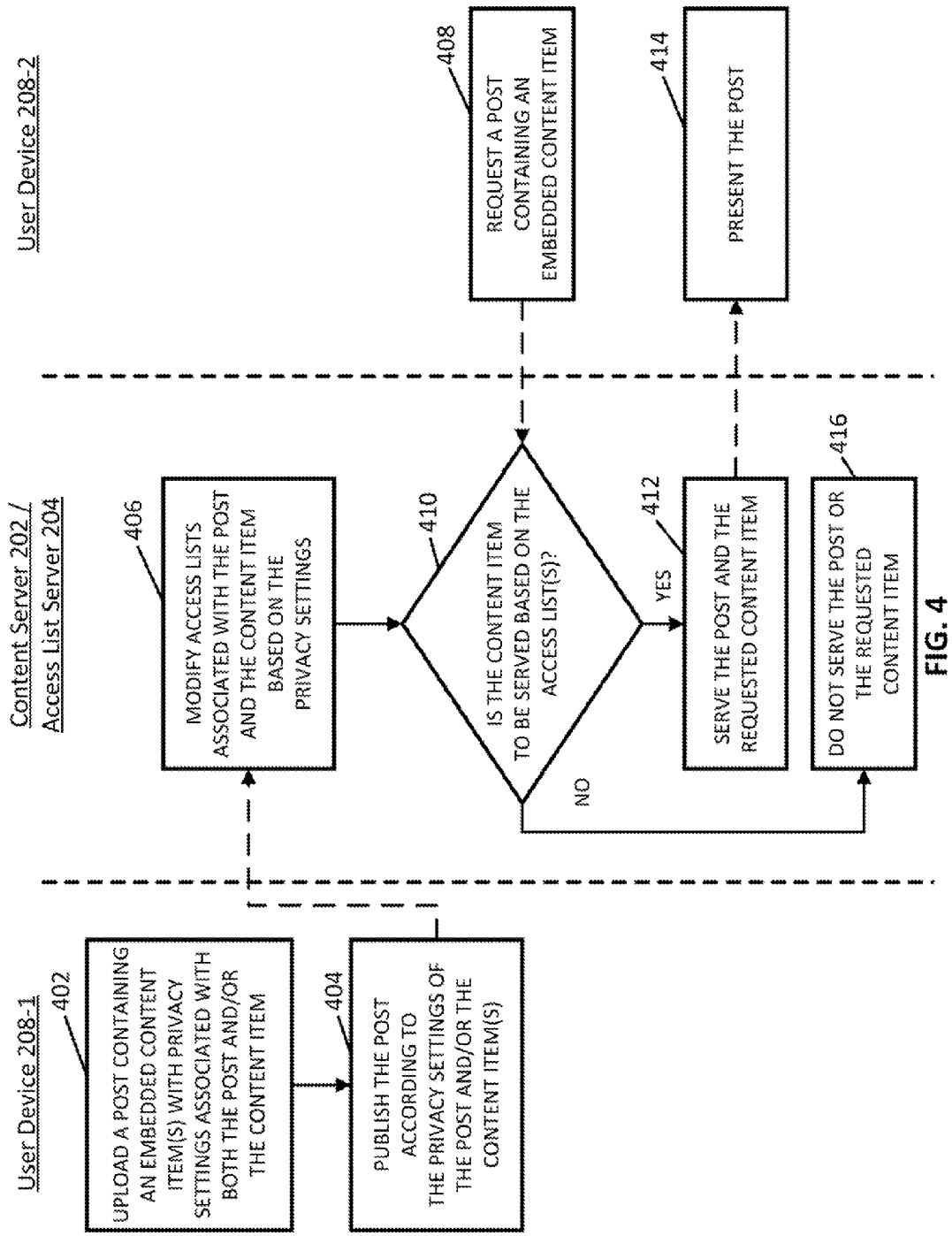
FIG. 4 shows an example of a data flow for sending and receiving requests to set and/or modify privacy settings, modifying access lists associated with the privacy settings, and determining whether to present a content item based on an associated access list.

FIG. 4 shows an example 400 of a data flow that can be implemented on multiple devices for publishing a post, modifying an access list associated with the post, receiving a request to present the post, serving the post in accordance with the access list, and presenting the post, is shown in accordance with some embodiments of the disclosed subject matter.

A first user device 208-1 can begin by uploading a post containing one or more embedded content items and privacy settings associated with the post and/or the embedded content item(s) at 402. User device 208-1 can create and/or modify the post, embedded content items, and/or privacy settings using any suitable technique or combination of techniques. For example, in some embodiments, the post, embedded content items, and/or privacy settings can be uploaded using user interfaces 100 and/or 150 presented on user device 208-1, as described above in connection with FIGS. 1A and 1B. As another example, in some embodiments, privacy settings associated with an existing post and/or content item can be modified, and user device 208-1 can upload the modified privacy settings. As yet another example, in some embodiments, a new post containing a previously created content item can be created, and user device 208-1 can upload the new post and privacy settings associated with the new post.

User device 208-1 can publish the post according to the privacy settings of the post and/or the content item(s) at 404 using any suitable technique or combination of techniques. For example, in some embodiments, user device 208-1 can transmit the post, content item(s), privacy settings to content server 202 and/or access list server 204 using communication network 206.

Access list server 204 can modify the access lists associated with the post and the content item based on the associated privacy settings at 406. In some embodiments, access list server 204 can receive a request to modify the access lists from content server 202, which received the published post and/or content items. Access list server 204 can modify the access lists using any suitable technique or combination of techniques. For example, in some embodiments, access list server 204 can perform one or both of the processes described below in connection with FIGS. 5 and 6.

A second user device 208-2 can request a post containing an embedded content item at 408 using any suitable technique or combination of techniques. For example, in some embodiments, user device 208-2 can generate a request in response to instructions included in a particular web page (e.g., a home page of a social networking site, a page corresponding to a particular user on the social networking site, and/or any other suitable web page) that has been loaded/is being loaded. User device 208-2 can transmit the request to a suitable device (e.g., content server 202) via communication network 206.

Access list server 204 can determine if the requested post and/or content item are to be served based on the modified access lists at 410 using any suitable technique or combination of techniques. For example, in some embodiments, access list server 204 can first receive an indication from content server 202 indicating a requested post(s) and/or a content item(s). Access list server 204 can subsequently identify the access list(s) associated with the requested post and/or content item(s) and can verify that a user associated with user device 208-2 is indicated on the access list(s) using any suitable technique, for example, as described below in connection with FIGS. 5 and/or 6. In some embodiments, access list server 204 can transmit an indication of the result of the determination to content server 202.

If it is determined that the user associated with user device 208-2 is not indicated on the access list(s) ("No" at 410), process 400 can not serve the post and the requested content item at 416.

If it is determined that the user associated with user device 208-2 is indicated on the access list(s) ("Yes" at 410), process 400 can serve the post and the requested content item at 412 from any suitable device (e.g., content server 202) using any suitable technique or combination of techniques. For example, in some embodiments, instructions for loading a web page containing the post and the requested content item can be transmitted to user device 208-2 via communication network 206. As a more particular example, the web page can contain the post as one of multiple posts, which can be presented as an aggregated feed of posts.

User device 208-2 can present the post and/or the content item(s) at 414 using any suitable technique or combination of techniques. For example, in some embodiments, user device 208-2 can load a web page containing the post and/or the content item(s) via communication network 206 and can present the received web page using display/audio output 312.

Figure 5:
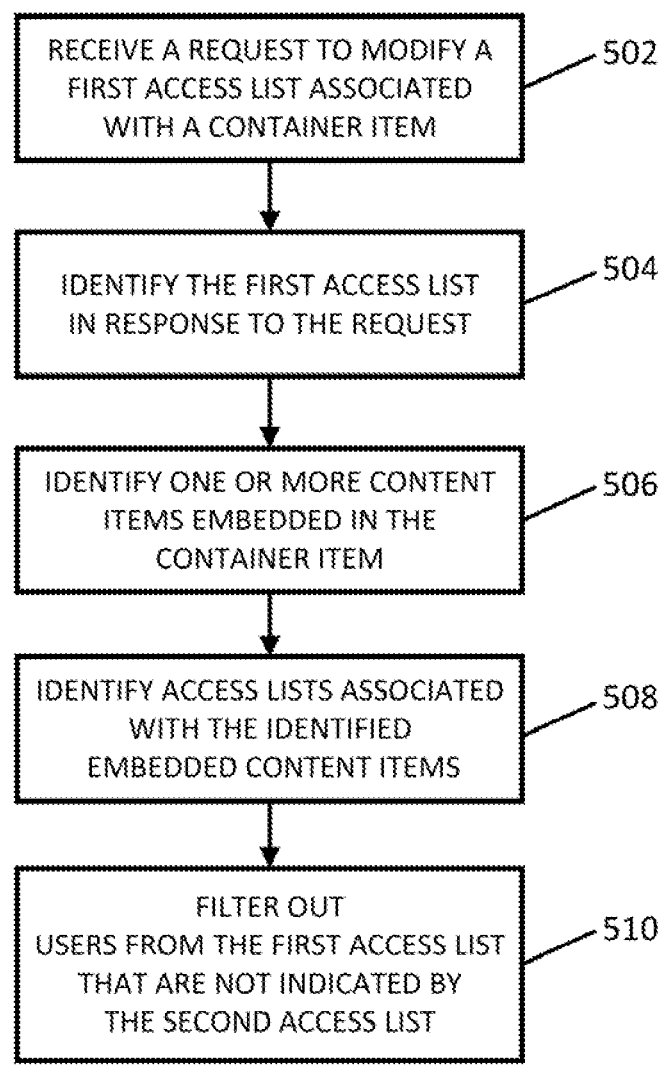
FIG. 5 shows an example of a process for modifying an access list associated with a container item based on an access list associated with an embedded content item embedded in the container item in accordance with some embodiments of the disclosed subject matter.

Turning to FIG. 5, an example of a process 500 for modifying an access list associated with a container item based on an access list associated with a content item embedded in the content item in accordance with some embodiments of the disclosed subject matter.

Process 500 can begin by receiving a request to create and/or modify an access list associated with a container item at 502. Any suitable information can be included in the request. For example, in some embodiments, the request can indicate that an access list associated with the container item is to be modified because the container item is a newly created container item which contains one or more older content items having associated access lists. As a more particular example, the request can indicate that a new post on a social networking site has been created by a second user sharing an embedded content item created by a first user. As another more particular example, the request can indicate that a new post on a social networking site has been created by a first user, where the new post contains an embedded content item created by the first user. As another example, in some embodiments, the request can indicate that the access list associated with the container item is to be modified because privacy settings associated with an existing container item have been changed. As yet another example, in some embodiments, the request can indicate that the access list associated with the container item is to be modified because privacy settings associated with an embedded content item within the container item have been changed. As a more particular example, the request can indicate that privacy settings corresponding to a video embedded in a post on a social networking site have been changed, and therefore, that the access list associated with the post are to be changed accordingly. In some embodiments, the received request can also indicate one or more users and/or groups to be added to and/or removed from the access list associated with the container item, for example, based on information entered using privacy settings 124 in user interface 100 (e.g., as described above in connection with FIGS. 1A and 1B).

The request received at 502 can be transmitted from any suitable interface and/or device. For example, the request can be transmitted from user device 208 upon determining that privacy settings 124 in user interface 100 has been modified. Process 500 can receive the request using any suitable device, for example, access list server 204 and/or content server 202.

At 504, process 500 can identify an access list associated with the container item in response to receiving the request. Process 500 can identify the access list using any suitable technique or combination of techniques. For example, in some embodiments, the container item specified in the received request can be associated identifying information of the access list with which it is associated and/or a location in memory 304 at which the access list is stored, and process 500 can evaluate the identifying information to identify the access list. As another example, in instances where the received request indicates that privacy settings associated with a content item embedded in the container item have changed, process 500 can identify one or more container items associated with the embedded content item before identifying an access list (or lists) associated with the one or more container items.

Process 500 can identify one or more content items embedded in the container item at 506. Note that, in some embodiments, the creator of the embedded content item(s) can be different from the creator of the container item. Process 500 can identify the embedded content items using any suitable technique. For example, in some embodiments, the container item can be associated with one or more lists of content items embedded in the container item (e.g., a list of photos contained in a document, a list of videos contained in a post on a social networking site, and/or any other suitable list of embedded content items), and process 500 can access the list of associated content items to determine which content items are embedded within the container item. As another example, in some embodiments, the set of content items contained in the container item can be calculated by searching and/or crawling over a superset of container items and/or embedded content items to determine which embedded content items are associated with which container items, and vice versa. The searching and/or crawling can be performed at any suitable frequency (e.g., every thirty minutes, every hour, every two hours, once per day, and/or any other suitable frequency).

After determining the one or more content items embedded within the container item, in some embodiments, process 500 can identify the one or more access lists associated with the one or more embedded content items at 508 using any suitable technique or combination of techniques. For example, in some embodiments, each embedded content item can be associated with identifying information that indicates the associated access list and/or a location in memory associated with the access list, and process 500 can evaluate the identifying information to access the access list associated with an embedded content item.

Process 500 can modify the access list associated with the container item at 510. In some embodiments, process 500 can modify the access list associated with the container item by filtering out users from the access list associated with the container item that are not on the access list (or access lists) associated with content items embedded within the container item. For example, in some embodiments, process 500 can modify the access list associated with the container item to be the intersection of the access list associated with the container item and the access list (or access lists) associated with the one or more embedded content items. As a more particular example, if the access list associated with an embedded content item includes the group "John's Family" and an access list associated with the container item includes the groups "John's Family," and "John's Classmates," process 500 can modify the access list associated with the container item to exclude users included in the group "John's Classmates" that are not included in the group "John's Family." As another example, in some embodiments, process 500 can modify the access list associated with the container item to be equivalent to the access list(s) associated with one or more embedded content items. As a more particular example, if the access list associated with an embedded content item includes the groups "John's Family" and "John's Classmates," process 500 can modify the access list associated with the container item to include only the groups "John's Family" and "John's Classmates" (e.g., to filter out users that were previously able to access the container item).

Process 500 can modify the access lists associated with the one or more containers using any suitable technique or combination of techniques. For example, hardware processor 302 (e.g., on access list server 204) can be programmed to compare the access list(s) associated with one or more embedded content items and the access list associated with the container item to determine the intersection of the access lists. As a more particular example, process 500 can determine which users and/or groups of users are on both the access list associated with a container and the access list associated with an embedded content item within the container item. In some embodiments, after determining the intersection between two access lists, process 500 can modify the access list associated with the container item accordingly. For example, process 500 can remove any users and/or groups on the access list associated with the container item who are not determined to be on the access list associated with the embedded content item.

Figure 6:
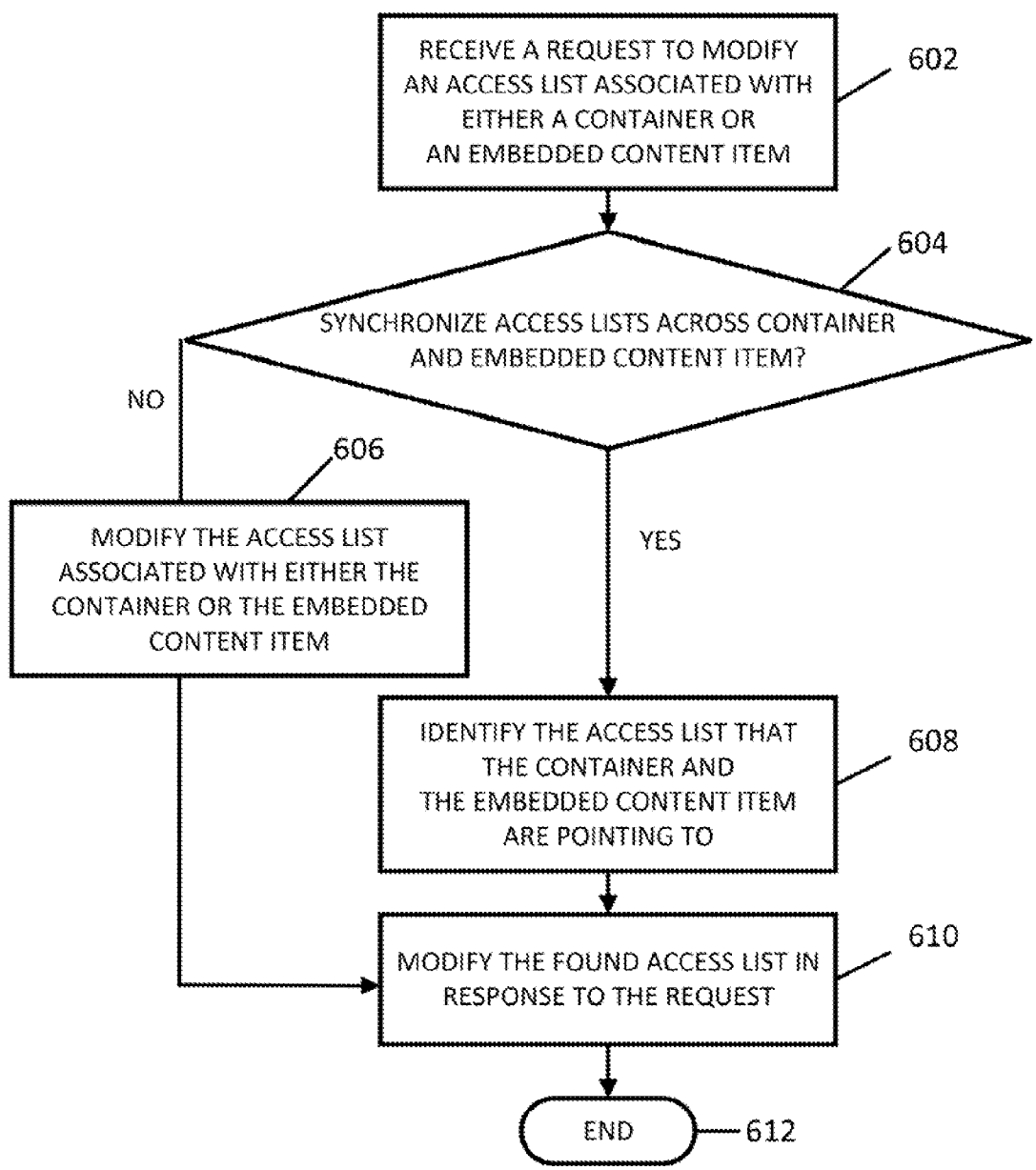
FIG. 6 shows an example of a process for modifying access lists associated with a container item and/or an embedded content item in accordance with some embodiments of the disclosed subject matter.

Turning to FIG. 6, an example 600 of a process for modifying an access list associated with a container item and/or an embedded content item is shown in accordance with some embodiments of the disclosed subject matter.

In some embodiments, process 600 can begin by receiving a request to modify an access list associated with a container item and/or an embedded content item at 602. Process 600 can receive the request in any suitable manner and from any suitable entity. For example, process 600 can receive the request based on a modification of one or more privacy settings elements in a user interface presented on user device 208, such as privacy settings 114 and/or 156 in user interface 100 and/or 150 as described above in connection with FIGS. 1A and 1B. The request can be received by any suitable device. For example, in some embodiments, the request can be received by access list server 204. As another example, in some embodiments, the request can be received by content server 202. In some such embodiments, content server 202 can receive the request and subsequently transmit the request to access list server 204 using communication network 206.

The request received at 602 can include any suitable information. For example, the request can include an identifying information of one or more container items and/or embedded content items associated with the access list which is to be modified. As another example, in some embodiments, the request can include an indication of one or more users and/or groups of users that are to be added to the access list. As yet another example, in some embodiments, the request can include an indication of one or more users and/or groups of users that are to be removed from the access list. As still another example, the request can indicate that a creator of the container item and a creator of an embedded content item are different entities (e.g., a first user shared another user's embedded content item in a post). In some embodiments, the indication of the one or more users and/or groups of users can correspond to the users and/or groups specified in set of allowed viewers 118 and/or 128, as shown in and described above in connection with FIGS. 1A and 1B. In some embodiments, any suitable number of users and/or groups of users can be indicated by the request.

At 604, process 600 can determine whether the access list for the item specified in the received request (e.g., the container and/or the embedded content item) is to be synchronized with the access list of the corresponding embedded content item or container item such that both access lists contain the same set of allowed viewers. For example, if the received request is related to an embedded content item, process 600 can determine whether the access list associated with a container item containing the embedded content item is to be modified to match the access list associated with the embedded content item. Process 600 can use any suitable technique or combination of techniques to determine whether the access lists are to be synchronized. For example, in some embodiments, a flag can be set which can indicate whether the access lists is to be synchronized, and process 600 can check a state of the flag.

If process 600 determines that the access list of the content indicated in the received request is not to be synchronized with the corresponding container or embedded content item ("No" at 604), process 600 can modify the access list associated with either the container or the embedded content item at 606 in accordance with the received request. Note that, in some embodiments where the access list of the specified content is not synchronized with the access list of the corresponding container item or embedded content item (that is, where the access lists associated with the container item and the embedded content item(s) are separate and potentially different), the access lists associated with both the container item and each embedded content item can be checked before the container item and the embedded content item are served and/or presented by any suitable device (e.g., content server 202, access list server 204, and/or user device 208) and/or process. For example, if a request is received to deliver a post containing an embedded video, access list server 204 can check the access lists associated with both the post and the embedded video, and can deliver the post and the embedded video only if a user requesting the post containing the embedded video is an allowed viewer of both the post and the embedded video, as indicated by both access lists. In some embodiments, the creator of the post and the creator of the embedded video as described in this example can be different users and/or groups (e.g., the creator of the post shared the embedded video).

In some embodiments, process 600 can modify the access list using any suitable technique or combination of techniques. For example, if the request received at 602 includes one or more users and/or groups of users to be added to the access list, hardware processor 302 (e.g., included in access list server 204 and/or content server 202) can identify the access list in memory 304 and can append the users and/or groups of users indicated in the request to the access list. In some embodiments, process 600 can check if a specified user and/or group of users is already included in the access list before adding the user and/or group of users. As another example, if the request received at 602 includes one or more users and/or groups of users to be removed from the access list, hardware processor 302 can search for the specified users and/or groups of users and can filter out the specified users and/or groups of users once found using any suitable technique or combination of techniques. As a more particular example, in some embodiments, hardware processor 302 can iterate through the access list until the specified users and/or groups of users are found. As another particular example, in some embodiments, hardware processor 302 can fully or partially sort the access list before searching for the specified users and/or groups of users. As yet another particular example, process 600 can re-organize the modified access list using any suitable technique (e.g., deleting a now-empty row and/or column in an array, re-sorting the access list, and/or any other suitable technique). In some embodiments, the access list can be stored as an indexed list. In some embodiments, process 600 can then terminate at 512 after modifying the access list.

If process 600 determines that the access lists associated with the content specified in the received request and the access list associated with the corresponding container item or embedded content item are to be synchronized ("Yes" at 604), process 600 can identify one or more access lists associated with a container item and/or an embedded content item at 608. In some embodiments, the container item and the embedded content item can share one access list. For example, in some embodiments, the container item and the embedded content item can be associated with an indicator that identifies the shared access list, and process 600 can identify the shared access list by accessing an indicator associated with the container item and/or the embedded content item which can specify the location of the shared access list in memory 304. Alternatively, in some embodiments, the container item and the embedded content item can each be associated with separate access lists, and process 600 can identify each access list by accessing multiple values associated with the container item and the embedded content item which specify the locations of the multiple access lists.

Process 600 can modify the identified access list(s) at 610. In cases in which the container item and the embedded content item are associated with a shared access list, process 600 can modify the shared access list in accordance with the request received at 602. Alternatively, in cases in which the container item and the embedded content item are each associated with a separate access list, process 600 can modify each access list such that both access lists contain the same set of allowed viewers (e.g., those specified in set of allowed viewers 118 and/or 128 as shown in and described in connection with FIGS. 1A and 1B) and are therefore synchronized with each other. As a specific example, if the received request indicates that an access list associated with a container item (e.g., a post on a social networking site) is to be modified to remove users that are included in the access list due to their inclusion in the group "Colleagues," process 600 can modify both the access list associated with the container item and the access list(s) associated with any embedded content items (e.g., any photos, links, videos, and/or any other content items) included in the container item. Process 600 can use any suitable technique or combination of techniques to modify one or more access lists, for example, the techniques described above in connection with 606. Process 600 can then terminate at 512 after modifying the one or more access lists.

Note that, in some embodiments, a service implementing the processes shown in FIGS. 5 and/or 6 can determine which process to use based on a current situation. For example, in a situation where a second user shares an embedded content item created by a first user (e.g., by creating a post on a social networking site which contains the embedded content item), the service can determine that an access list associated with the post is to be modified to filter out users that are not on an access list associated with the embedded content item (that is, the service can determine that the process shown in FIG. 6 is to be implemented).

As another example, in a situation where a user modifies privacy settings related to a post (e.g., on a social networking site) containing an embedded content item created by the user such that the post is to be visible to more users, the service can determine that an access list associated with the embedded content item is to be modified to be equivalent to an access list associated with the post, ensuring that viewers of the post can view the embedded content item (that is, the service can determine that the process shown in FIG. 5 is to be implemented).

In some embodiments, access lists for a container item and an embedded content item can be synchronized in instances where the container item and the embedded content item are associated with different services and/or providers (e.g., different social networking sites, different media content hosting services, and/or any other suitable services and/or providers). Additionally, in some such embodiments, synchronization of access lists associated with different services and/or providers can include requesting permission to check the access lists associated with the different services and/or providers. Additionally or alternatively, in some embodiments, synchronization of access lists can be implemented using one or more suitable Application Programming Interfaces (APIs) associated with the different services and/or providers.

In some embodiments, at least some of the above described blocks of the processes of FIGS. 4, 5, and 6 can be executed or performed in any order or sequence not limited to the order and sequence shown in and described in connection with the figures. Also, some of the above blocks of FIGS. 4, 5, and 6 can be executed or performed substantially simultaneously where appropriate or in parallel to reduce latency and processing times. Additionally or alternatively, some of the above described blocks of the processes of FIGS. 4, 5, and 6 can be omitted.

In some embodiments, any of the above described blocks of the processes of FIGS. 4, 5, and 6 can be executed or performed by any of the hardware processors of any of content server 202, access list server 204, and/or user device 208, or any suitable combination thereof.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for controlling access to content, comprising:
   receiving a first request to modify a first access list associated with a first container item, wherein the first access list indicates a set of users that are authorized to access the first container item;
   identifying, using a hardware processor, the first access list in response to the first request;
   accessing a second access list associated with a content item embedded in the first container item, wherein the second access list indicates a set of users that are authorized to access the content item;
   modifying the first access list to filter out users from the first access list that are not included in the second access list;
   receiving a second request to modify a third access list associated with a second container item, wherein the third access list indicates a set of users that are authorized to access the second container item and wherein the third access list is a modified version of the first access list and the second container item is a modified version of the first container item;
   identifying the third access list in response to the second request;
   modifying the third access list to filter out users from the third access list that are not included in the second access list; and
   storing the first access list such that the first access list is accessible to a host of the first container item to verify that a requesting user is authorized to access the first container item.

2. The method of claim 1, wherein at least one of the first container item and the second container item is a post on a social networking site.

3. The method of claim 1, wherein at least one of the first container item and the second container item is a photo album.

4. The method of claim 1, wherein the first access list is modified to be equivalent to the second access list.

5. The method of claim 1, wherein the first access list is modified to be the intersection of the first access list and the second access list.

6. A method for controlling access to content, comprising:
   receiving a first request to modify a first access list associated with a first container item, wherein the first access list indicates a set of users that are authorized to access the first container item;
   identifying, using a hardware processor, the first access list in response to the first request;
   accessing a second access list associated with a content item embedded in the first container item, wherein the second access list indicates a set of users that are authorized to access the content item;
   modifying the first access list to filter out users from the first access list that are not included in the second access list;
   receiving a second request to modify a third access list associated with a second container item, wherein the third access list indicates a set of users that are authorized to access the second container item;
   identifying the third access list in response to the second request;
   accessing a fourth access list associated with a second content item embedded in the second container item, wherein modifying the first access list comprises excluding users that are not included in the second access list and that are not included in the fourth access list;
   modifying the third access list to filter out users from the third access list that are not included in the second access list; and
   storing the first access list such that the first access list is accessible to a host of the first container item to verify that a requesting user is authorized to access the first container item.

7. A system for controlling access to content, the system comprising:
   a hardware processor that is configured to:
      receive a first request to modify a first access list associated with a first container item, wherein the first access list indicates a set of users that are authorized to access the first container item;
      identify the first access list in response to the first request;
      access a second access list associated with a content item embedded in the first container item, wherein the second access list indicates a set of users that are authorized to access the content item;
      modify the first access list to filter out users from the first access list that are not included in the second access list;
      receive a second request to modify a third access list associated with a second container item, wherein the third access list indicates a set of users that are authorized to access the second container item and wherein the third access list is a modified version of the first access list and the second container item is a modified version of the first container item;
      identify the third access list in response to the second request;
      modify the third access list to filter out users from the third access list that are not included in the second access list; and
      store the first access list such that the first access list is accessible to a host of the first container item to verify that a requesting user is authorized to access the first container item.

8. The system of claim 7, wherein at least one of the first container item and the second container item is a post on a social networking site.

9. The system of claim 7, wherein at least one of the first container item and the second container item is a photo album.

10. The system of claim 7, wherein the first access list is modified to be equivalent to the second access list.

11. The system of claim 7, wherein the first access list is modified to be the intersection of the first access list and the second access list.

12. A system for controlling access to content, the system comprising:
a hardware processor that is configured to:
receive a first request to modify a first access list associated with a first container item, wherein the first access list indicates a set of users that are authorized to access the first container item;
identify the first access list in response to the first request;
access a second access list associated with a content item embedded in the first container item, wherein the second access list indicates a set of users that are authorized to access the content item;
modify the first access list to filter out users from the first access list that are not included in the second access list;
receive a second request to modify a third access list associated with a second container item, wherein the third access list indicates a set of users that are authorized to access the second container item;
identify the third access list in response to the second request;
access a fourth access list associated with a second content item embedded in the second container item, wherein modifying the first access list comprises excluding users that are not included in the second access list and that are not included in the fourth access list;
modify the third access list to filter out users from the third access list that are not included in the second access list; and
store the first access list such that the first access list is accessible to a host of the first container item to verify that a requesting user is authorized to access the first container item.

13. A non-transitory computer-readable medium containing computer executable instructions that, when executed by a processor, cause the processor to perform a method for controlling access to content, the method comprising:
receiving a first request to modify a first access list associated with a first container item, wherein the first access list indicates a set of users that are authorized to access the first container item;
identifying the first access list in response to the first request;
accessing a second access list associated with a content item embedded in the first container item, wherein the second access list indicates a set of users that are authorized to access the content item;
modifying the first access list to filter out users from the first access list that are not included in the second access list;
receiving a second request to modify a third access list associated with a second container item, wherein the third access list indicates a set of users that are authorized to access the second container item and wherein the third access list is a modified version of the first access list and the second container item is a modified version of the first container item;
identifying the third access list in response to the second request;
modifying the third access list to filter out users from the third access list that are not included in the second access list; and
storing the first access list such that the first access list is accessible to a host of the first container item to verify that a requesting user is authorized to access the first container item.

14. The non-transitory computer-readable medium of claim 13, wherein at least one of the first container item and the second container item is a post on a social networking site.

15. The non-transitory computer-readable medium of claim 13, wherein at least one of the first container item and the second container item is a photo album.

16. The non-transitory computer-readable medium of claim 13, wherein the first access list is modified to be equivalent to the second access list.

17. The non-transitory computer-readable medium of claim 13, wherein the first access list is modified to be the intersection of the first access list and the second access list.

18. A non-transitory computer-readable medium containing computer executable instructions that, when executed by a processor, cause the processor to perform a method for controlling access to content, the method comprising:
receiving a first request to modify a first access list associated with a first container item, wherein the first access list indicates a set of users that are authorized to access the first container item;
identifying the first access list in response to the first request;
accessing a second access list associated with a content item embedded in the first container item, wherein the second access list indicates a set of users that are authorized to access the content item;
modifying the first access list to filter out users from the first access list that are not included in the second access list;
receiving a second request to modify a third access list associated with a second container item, wherein the third access list indicates a set of users that are authorized to access the second container item;
identifying the third access list in response to the second request;
accessing a fourth access list associated with a second content item embedded in the second container item, wherein modifying the first access list comprises excluding users that are not included in the second access list and that are not included in the fourth access list;
modifying the third access list to filter out users from the third access list that are not included in the second access list; and
storing the first access list such that the first access list is accessible to a host of the first container item to verify that a requesting user is authorized to access the first container item.

* * * * *